(12) United States Patent
Chinone et al.

(10) Patent No.: US 12,517,170 B2
(45) Date of Patent: Jan. 6, 2026

(54) SEMICONDUCTOR DEVICE INSPECTION METHOD AND SEMICONDUCTOR DEVICE INSPECTION DEVICE

(71) Applicant: HAMAMATSU PHOTONICS K.K., Hamamatsu (JP)

(72) Inventors: Norimichi Chinone, Hamamatsu (JP); Tomonori Nakamura, Hamamatsu (JP); Akira Shimase, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 411 days.

(21) Appl. No.: 17/926,390

(22) PCT Filed: Apr. 5, 2021

(86) PCT No.: PCT/JP2021/014505
§ 371 (c)(1),
(2) Date: Nov. 18, 2022

(87) PCT Pub. No.: WO2021/241008
PCT Pub. Date: Dec. 2, 2021

(65) Prior Publication Data
US 2023/0184825 A1    Jun. 15, 2023

(30) Foreign Application Priority Data
May 26, 2020 (JP) ................. 2020-091373

(51) Int. Cl.
*G01R 31/308* (2006.01)
*G01R 31/28* (2006.01)

(52) U.S. Cl.
CPC ....... *G01R 31/2879* (2013.01); *G01R 31/287* (2013.01)

(58) Field of Classification Search
CPC .............. G01R 31/2879; G01R 31/287; G01R 31/311; G01R 31/308; G01R 31/319; G01R 31/31715
See application file for complete search history.

(56) References Cited

U.S. PATENT DOCUMENTS 5,329,359 A * 7/1994 Tachikawa ........... G01B 11/026
356/394
2002/0011852 A1* 1/2002 Mandelis ............. G01R 31/311
324/750.02

(Continued)

FOREIGN PATENT DOCUMENTS

JP    H6-300824 A    10/1994
JP    2010-197051 A    9/2010

(Continued)

OTHER PUBLICATIONS

Ravi Bharath Viswanath et al, "Investigation of Multiple Heat Source Effects in Lock-In Thermography Applications in Semiconductor Packages", IEEE Transactions on Components, Packaging and Manufacturing Technology, IEEE, USA, vol. 8, No. 5, 2018/05/01, p. 725-p. 734, XP011683156.

(Continued)

*Primary Examiner* — Catherine T. Rastovski
*Assistant Examiner* — Emma Alexander
(74) *Attorney, Agent, or Firm* — Faegre Drinker Biddle & Reath LLP

(57) ABSTRACT

A semiconductor inspection device includes: a measuring device that supplies power to a semiconductor device and measures the electrical characteristics of the semiconductor device; an optical scanning device that scans the semiconductor device with light intensity-modulated with a plurality of frequencies; a lock-in amplifier that acquires a characteristic signal indicating the electrical characteristics of the plurality of frequency components; and an inspection device that corrects a phase component of the characteristic signal at an arbitrary scanning position with a phase component at a scanning position reflecting the electrical characteristics of a first layer in the semiconductor device as a reference, specifies a phase component of the characteristic signal at a scanning position reflecting the electrical characteristics of a second layer, normalizes the phase component of the characteristic signal at the arbitrary scanning position by using the phase component, and outputs a result based on the normalized phase component.

18 Claims, 14 Drawing Sheets

(56) References Cited

U.S. PATENT DOCUMENTS

| | | |
|---|---|---|
| 2009/0003685 A1 | 1/2009 | Nikawa |
| 2014/0346360 A1 | 11/2014 | Altmann |
| 2017/0123004 A1 | 5/2017 | Nakamura |

FOREIGN PATENT DOCUMENTS

| | | | |
|---|---|---|---|
| JP | 2011-047825 A | 3/2011 | |
| JP | 2013-526723 A | 6/2013 | |
| JP | 2016-014553 A | 1/2016 | |
| JP | 2016-534344 A | 11/2016 | |
| TW | 201903394 A | 1/2019 | |
| TW | 202004206 A | 1/2020 | |
| WO | WO-2011156527 A1 * | 12/2011 | ............ G01J 5/0066 |
| WO | WO-2013/008850 A1 | 1/2013 | |
| WO | WO-2015/024679 A1 | 2/2015 | |
| WO | WO-2018/061378 A1 | 4/2018 | |
| WO | WO-2021/241007 A1 | 12/2021 | |
| WO | WO-2022174666 A1 * | 8/2022 | ............ G01S 17/34 |

OTHER PUBLICATIONS

Jacobs, K.J.P. et al., "Lock-in thermal laser stimulation for non-destructive failure localization in 3-D devices," Microelectronics Reliability, vol. 76-77, 2017, pp. 188-193.

Schmidt, Christian et al., "Non-destructive defect depth determination at fully packaged and stacked die devices using Lock-in Thermography," 2010 17th IEEE International Symposium on the Physical and Failure Analysis of Integrated Circuits, Jul. 5, 2010.

International Preliminary Report on Patentability issued Dec. 8, 2022 in WO Patent Application No. PCT/JP2021/014505.

* cited by examiner

SEMICONDUCTOR DEVICE INSPECTION METHOD AND SEMICONDUCTOR DEVICE INSPECTION DEVICE

TECHNICAL FIELD

One aspect of an embodiment relates to a semiconductor device inspection method and a semiconductor device inspection device.

BACKGROUND ART

Lock-in Optical Beam Induced Resistance Change (OBIRCH) has been known as a method for analyzing the electrical characteristics of a semiconductor device in which semiconductor chips are stacked in a three-dimensional manner (for example, see Non Patent Literature 1 below). According to this method, failure analysis of a semiconductor device is realized in a non-destructive manner by measuring changes in electrical characteristics, such as resistance, while scanning the semiconductor device with a laser.

CITATION LIST

Non Patent Literature

Non Patent Literature 1: K. J. P. Jacobs et al., "Lock-in thermal laser stimulation for non-destructive failure localization in 3-D devices", Microelectronics Reliability, Vol. 76-77 (2017), Pages 188-193.

SUMMARY OF INVENTION

Technical Problem

In the conventional method described above, when a semiconductor device in which semiconductor chips are stacked in a plurality of layers in the direction of laser emission is a target, it is desired to analyze the electrical characteristics corresponding to the stacked structure.

Therefore, one aspect of the embodiment has been made in view of such a problem, and it is an object thereof to provide a semiconductor device inspection method and a semiconductor device inspection device capable of analyzing electrical characteristics corresponding to the stacked structure of a semiconductor device.

Solution to Problem

A semiconductor device inspection method according to an aspect of an embodiment includes: a step of supplying power to a semiconductor device and measuring electrical characteristics of the semiconductor device according to the supply of the power; a step of scanning the semiconductor device with light intensity-modulated with a first frequency and light intensity-modulated with a second frequency higher than the first frequency and acquiring a characteristic signal indicating the electrical characteristics of the first frequency component and the second frequency component according to the scanning; a step of correcting a phase component of the characteristic signal at an arbitrary scanning position with a phase component of the characteristic signal at a first scanning position reflecting the electrical characteristics of a first position in an optical axis direction of the light in the semiconductor device as a reference; a step of specifying a phase component of the characteristic signal at a second scanning position reflecting the electrical characteristics of a second position different from the first position in the optical axis direction of the light in the semiconductor device and normalizing the phase component of the characteristic signal at the arbitrary scanning position by using the phase component; and a step of outputting a result based on the normalized phase component of the characteristic signal at the arbitrary scanning position.

Alternatively, a semiconductor device inspection device according to another aspect of the embodiment includes: a measuring device configured to supply power to a semiconductor device and measure electrical characteristics of the semiconductor device according to the supply of the power; an optical scanning device configured to scan the semiconductor device with light intensity-modulated with a first frequency and light intensity-modulated with a second frequency higher than the first frequency; a signal acquisition device configured to acquire a characteristic signal indicating the electrical characteristics of the first frequency component and the second frequency component according to the scanning of the light; and a processor configured to process the characteristic signal. The processor corrects a phase component of the characteristic signal at an arbitrary scanning position with a phase component of the characteristic signal at a first scanning position reflecting the electrical characteristics of a first position in an optical axis direction of the light in the semiconductor device as a reference, specifies a phase component of the characteristic signal at a second scanning position reflecting the electrical characteristics of a second position different from the first position in the optical axis direction of the light in the semiconductor device, normalizes the phase component of the characteristic signal at the arbitrary scanning position by using the phase component, and outputs a result based on the normalized phase component of the characteristic signal at the arbitrary scanning position.

According to the one aspect or another aspect described above, a characteristic signal is acquired by measuring the electrical characteristics of the semiconductor device of the first frequency component and the second frequency component while scanning the semiconductor device with the light modulated with the first frequency and the light modulated with the second frequency. Then, the phase component of the acquired characteristic signal at the arbitrary scanning position is corrected with the phase component of the characteristic signal at the scanning position reflecting the electrical characteristics of the first position in the optical axis direction of the light in the semiconductor device as a reference. Then, the phase component of the characteristic signal at the scanning position reflecting the electrical characteristics of the second position in the optical axis direction in the semiconductor device is specified, and the phase component of the characteristic signal at the arbitrary scanning position is normalized by using the phase component. In addition, a result based on the normalized phase component of the characteristic signal at the arbitrary scanning position is output. Therefore, it is possible to estimate the layer structure of the semiconductor device at an arbitrary scanning position, and it is possible to analyze the electrical characteristics corresponding to the stacked structure of the semiconductor device.

Advantageous Effects of Invention

According to one aspect of the present invention, it is possible to analyze the electrical characteristics corresponding to the stacked structure of the semiconductor device.

DESCRIPTION OF EMBODIMENTS

Figure 1:
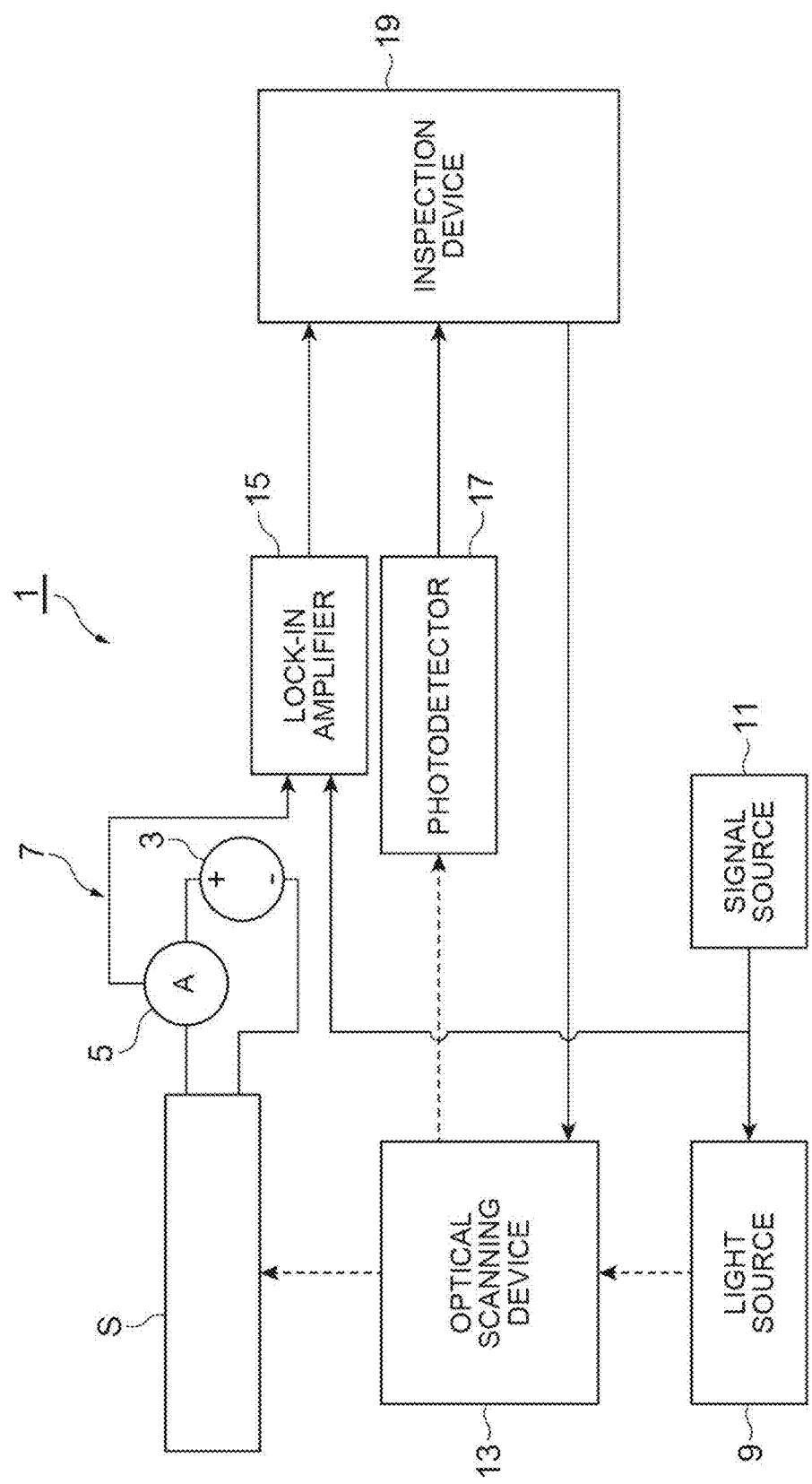
FIG. 1 is a schematic configuration diagram of a semiconductor inspection device 1 according to an embodiment.

Hereinafter, an embodiment of the present invention will be described in detail with reference to the accompanying diagrams. In addition, in the description, the same elements or elements having the same functions are denoted by the same reference numerals, and repeated description thereof will be omitted.

FIG. 1 is a schematic configuration diagram of a semiconductor inspection device 1, which is a semiconductor device inspection device according to an embodiment. The semiconductor inspection device 1 is a device for measuring the electrical characteristics at each point in order to analyze a failure portion of a semiconductor device, which is a device under test (DUT). As an object to be measured by the semiconductor inspection device 1, a semiconductor device in which a plurality of semiconductor chips are stacked in two or more layers is preferably used. In addition, in FIG. 1, the flow of electrical signals between devices is indicated by solid arrows, and the flow of optical signals between devices is indicated by dotted arrows.

That is, the semiconductor inspection device 1 is configured to include a measuring device 7 including a voltage application device 3 and a current measuring device 5, a light source 9, a signal source 11, an optical scanning device 13, a lock-in amplifier (signal acquisition device) 15, a photodetector 17, and an inspection device 19. Hereinafter, each component of the semiconductor inspection device 1 will be described in detail.

The measuring device 7 has two terminals. The two terminals are electrically connected to a semiconductor device S, so that a constant voltage is applied from the voltage application device 3 to the circuit formed in the semiconductor device S to supply the power. The current flowing through the semiconductor device S between the two terminals according to the supply is measured as an electrical characteristic by the current measuring device 5.

The light source 9 is, for example, a laser light source (emission source) that emits laser light. The light source 9 receives an AC signal generated at a variable frequency by the signal source 11 and generates laser light intensity-modulated by the frequency included in the AC signal. The AC signal may be a signal having a single frequency component, or may be a signal including a plurality of frequency components (for example, a rectangular wave signal). The optical scanning device 13 guides the laser light emitted from the light source 9 toward the semiconductor device S to irradiate the semiconductor device S, and scans the emission position of the laser light in the semiconductor device S in a two-dimensional manner along the surface of the semiconductor device S. Here, the two-dimensional scanning of the laser light in the optical scanning device 13 is controlled by the inspection device 19. In addition, the optical scanning device 13 guides reflected light, which is generated from the surface of the semiconductor device S according to the emission of the laser light, toward the photodetector 17. In addition, the light source 9 may be an SLD, an LED, a lamp light source, or the like that generates incoherent light.

The lock-in amplifier 15 monitors the AC signal output from the signal source 11 and receives a characteristic signal indicating the electrical characteristics measured by the measuring device 7, and extracts (lock-in detects) a frequency component having a modulation frequency of the laser light from the characteristic signal and outputs the frequency component to the inspection device 19. At this time, the lock-in amplifier 15 may extract a plurality of frequency components according to a plurality of frequency components included in the AC signal. The photodetector 17 receives reflected light generated by the semiconductor device S according to the laser light scanned by the optical scanning device 13, and outputs an intensity signal indicating the intensity of the reflected light to the inspection device 19.

The inspection device 19 is a data processor that is electrically connected to the lock-in amplifier 15, the photodetector 17, and the optical scanning device 13 and that controls two-dimensional scanning by the optical scanning device 13 and processes the characteristic signal from the lock-in amplifier 15 and the intensity signal from the photodetector 17.

Figure 2:
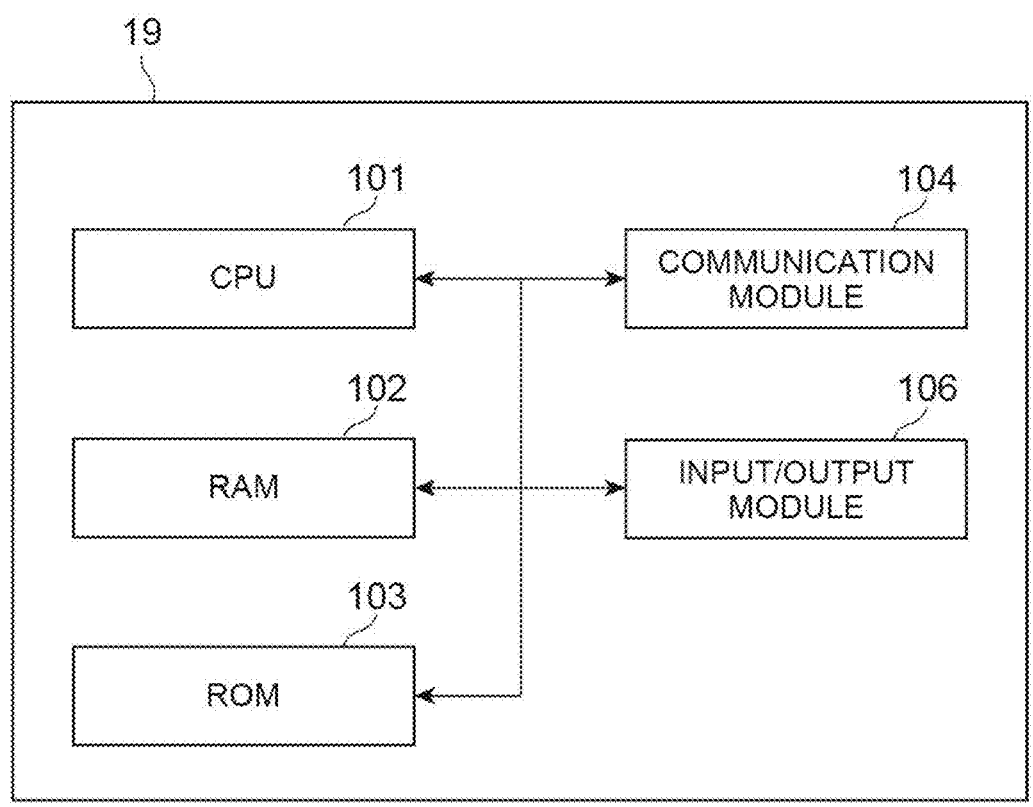
FIG. 2 is a block diagram showing an example of the hardware configuration of an inspection device 19 in FIG. 1.

FIG. 2 shows the hardware configuration of the inspection device 19. As shown in FIG. 2, the inspection device 19 is physically a computer including a CPU (Central Processing Unit) 101 as a processor, a RANI (Random Access Memory) 102 or a ROM (Read Only Memory) 103 as a recording medium, a communication module 104, an input/output module 106, and the like, which are electrically connected to each other. The function of the inspection device 19 is realized by reading a program or the like onto the hardware, such as the CPU 101 and the RAM 102, and by operating the communication module 104, the input/output module 106, and the like and performing data reading and writing in the RANI 102 under the control of the CPU 101. In addition, the inspection device 19 may include a display, a keyboard, a mouse, a touch panel display, and the like as input/output devices, and may include a data recording device, such as a hard disk drive and a semiconductor memory. In addition, the inspection device 19 may be configured by a plurality of computers.

Figure 3:
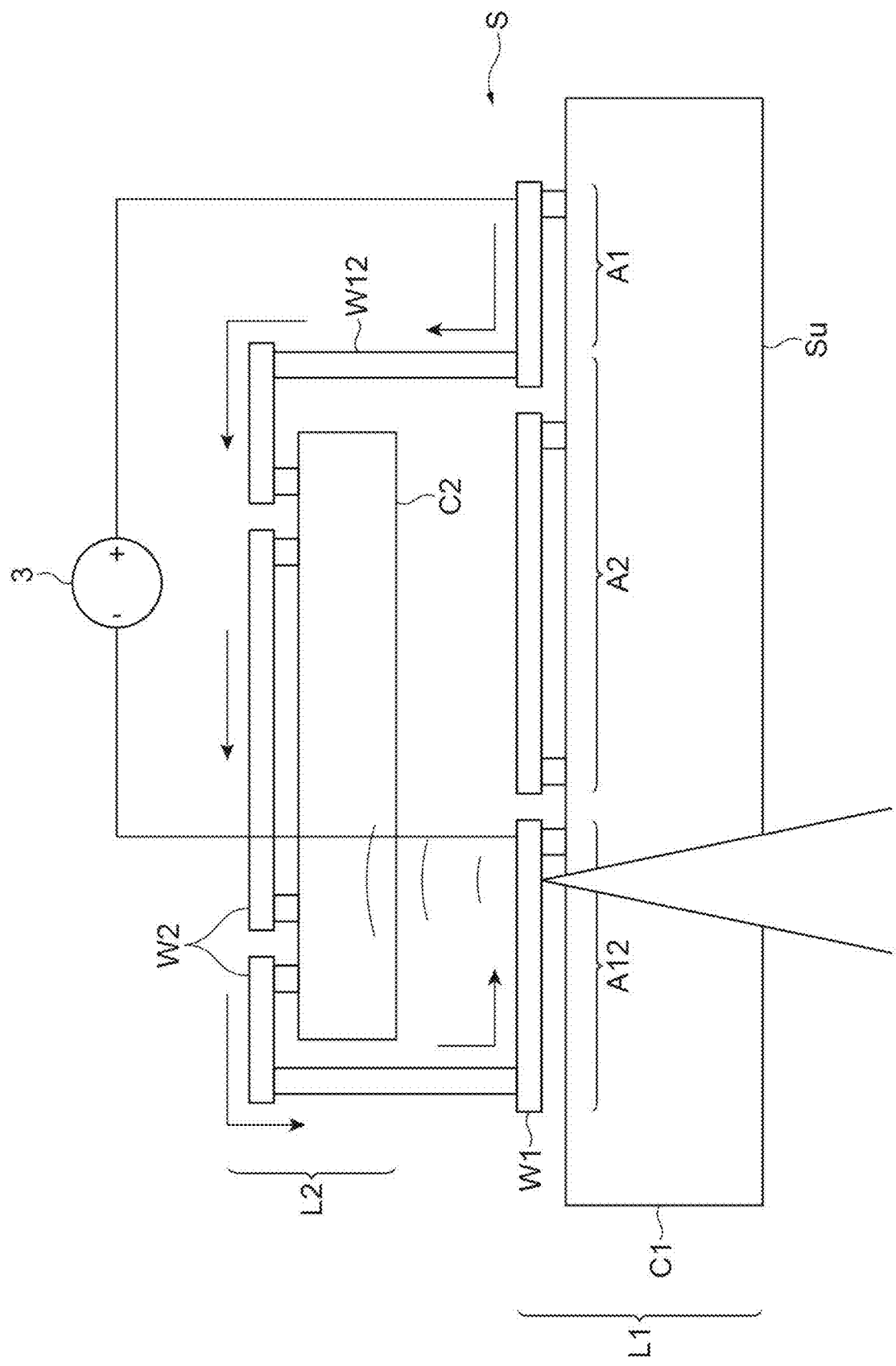
FIG. 3 is a diagram showing an example of a stacked structure of a semiconductor device S to be measured by the semiconductor inspection device 1.

FIG. 3 shows an example of the stacked structure of the semiconductor device S to be measured by the semiconductor inspection device 1. The semiconductor device S is a semiconductor device with a multilayer structure having at least a first layer L1 including a semiconductor circuit portion C1 and a wiring portion W1, a second layer L2 including a semiconductor circuit portion C2 and a wiring portion W2, and an interlayer wiring portion W12, for example. In addition, in FIG. 3, illustration of an insulating layer present between layers is omitted. In such a semiconductor device S, according to voltage application by the voltage application device 3 of the semiconductor inspection device 1, an area A1 where current is generated only in the first layer L1, an area A2 where current is generated only in the second layer L2, and an area A12 where current is generated in both the first layer L1 and the second layer L2 are generated along the interface direction between layers, that is, along the surface Su of the semiconductor device S. Laser light is emitted from the first layer L1 side to the semiconductor device S such that the optical axis of the laser light is approximately perpendicular to the interface (surface Su) between the layers. As a result, heat propagates from the position of the first layer L1 where the laser light is focused. Therefore, the electrical characteristics of the first layer L1 located at a first position near the light source 9 in the optical axis direction are reflected in the characteristic signal obtained for the irradiation of the area A1. In addition, the electrical characteristics of the second layer L2 located at a second position far from the light source 9 in the optical axis direction are reflected in the characteristic signal obtained for the irradiation of the area A2. In addition, the electrical characteristics of both the first layer L1 and the second layer L2 are reflected in the characteristic signal obtained for the irradiation of the area A12.

Next, the function of the inspection device 19 will be described in detail.

The inspection device 19 controls the optical scanning device 13 to scan the areas A1, A2, and A12 on the semiconductor device S in a two-dimensional manner with at least laser light intensity-modulated with a first frequency f1 and laser light intensity-modulated with a second frequency higher than the first frequency. In the present embodiment, the inspection device 19 also performs control to scan the semiconductor device S with laser light beams intensity-modulated with a plurality of frequencies other than the first and second frequencies f1 and f2. Such laser light beams intensity-modulated with a plurality of frequencies may be separately emitted. In addition, in the form of laser light intensity-modulated to a rectangular wave, a state in which laser light beams intensity-modulated with a plurality of frequencies are simultaneously emitted may be realized.

Figure 4:
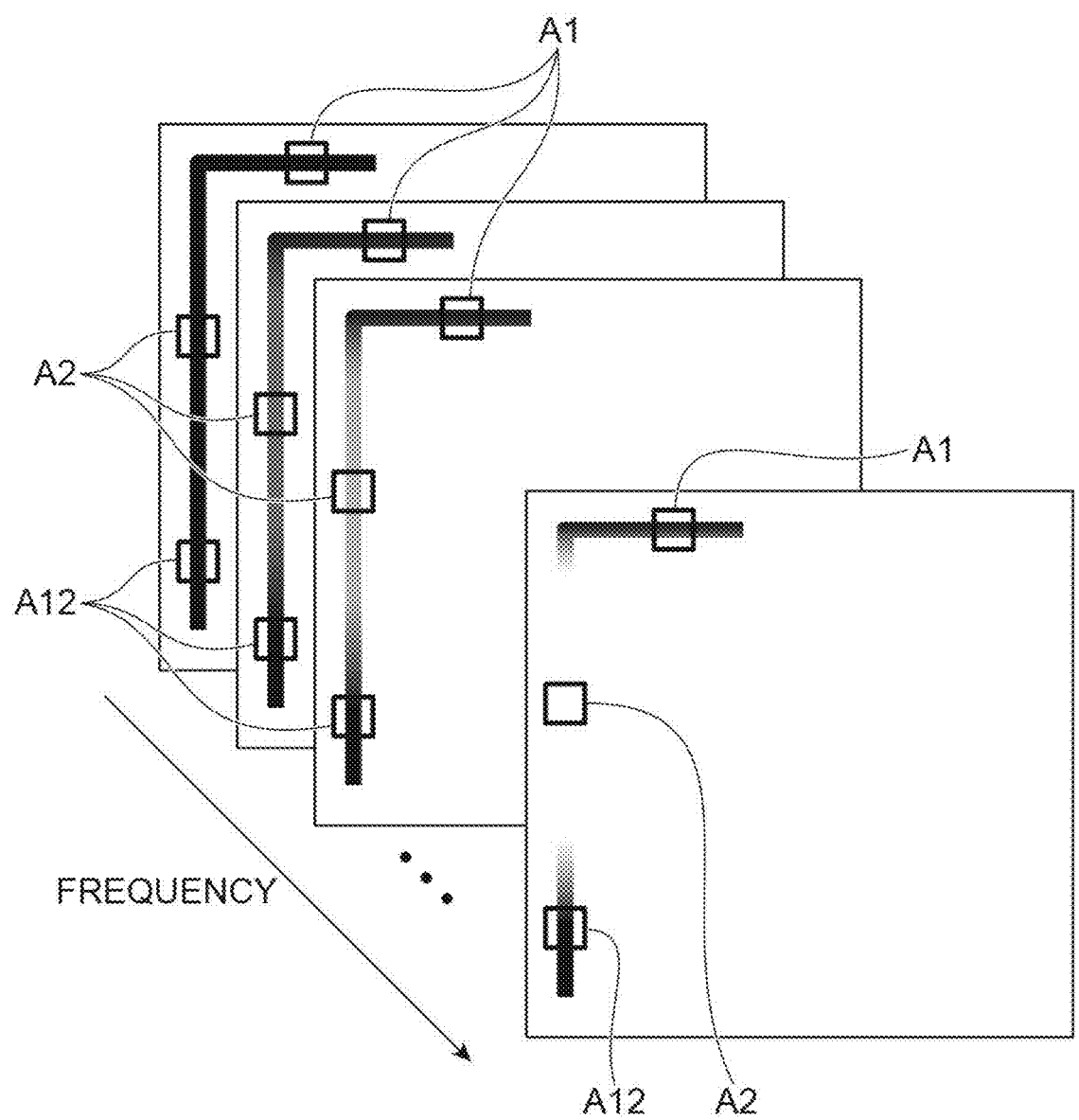
FIG. 4 is a diagram showing an image in which characteristic signals of a plurality of frequency components acquired by the inspection device 19 are expressed as two-dimensional images.

In addition, the inspection device 19 acquires a characteristic signal lock-in detected for each of a plurality of frequency components f1, f2, . . . , as a signal expressed in its phase and amplitude or complex numbers, for each scanning position of the semiconductor device S according to the scanning control of the laser light beams with the plurality of modulation frequencies f1, f2, . . . , and converts these characteristic signals into two-dimensional images and analyze the two-dimensional images. FIG. 4 shows an image in which characteristic signals of a plurality of frequency components acquired by the inspection device 19 are expressed as two-dimensional images. A filter, such as a Gaussian filter, may be applied to the two-dimensional image. Theoretically, assuming that temperature changes in the first layer L1 and the second layer L2 are $\Delta T_1$ and $\Delta T_2$, respectively, and the temperature coefficients of the first layer L1 and the second layer L2 are $\gamma_1$ and $\gamma_2$, respectively, a signal SG obtained by expressing the amplitude and phase of the characteristic signal, which is obtained when each scanning position on the semiconductor device S is irradiated with the laser light, as a complex number can be expressed by the following Equation (1).

$$SG = \gamma_1 \Delta T_1 + \gamma_2 \Delta T_2 \quad (1)$$

The inspection device 19 has a function of analyzing the characteristic signal for each layer using such characteristics.

Here, at least one scanning position included in the area A1 of the semiconductor device S is set in advance in the inspection device 19 by the user based on the design data. Alternatively, the scanning position is automatically specified in advance by the inspection device 19 based on the design data. Alternatively, the inspection device 19 may set, as a scanning position, a place where the change of the phase component with respect to the frequency, which will be described later, is the smallest.

Figure 5:
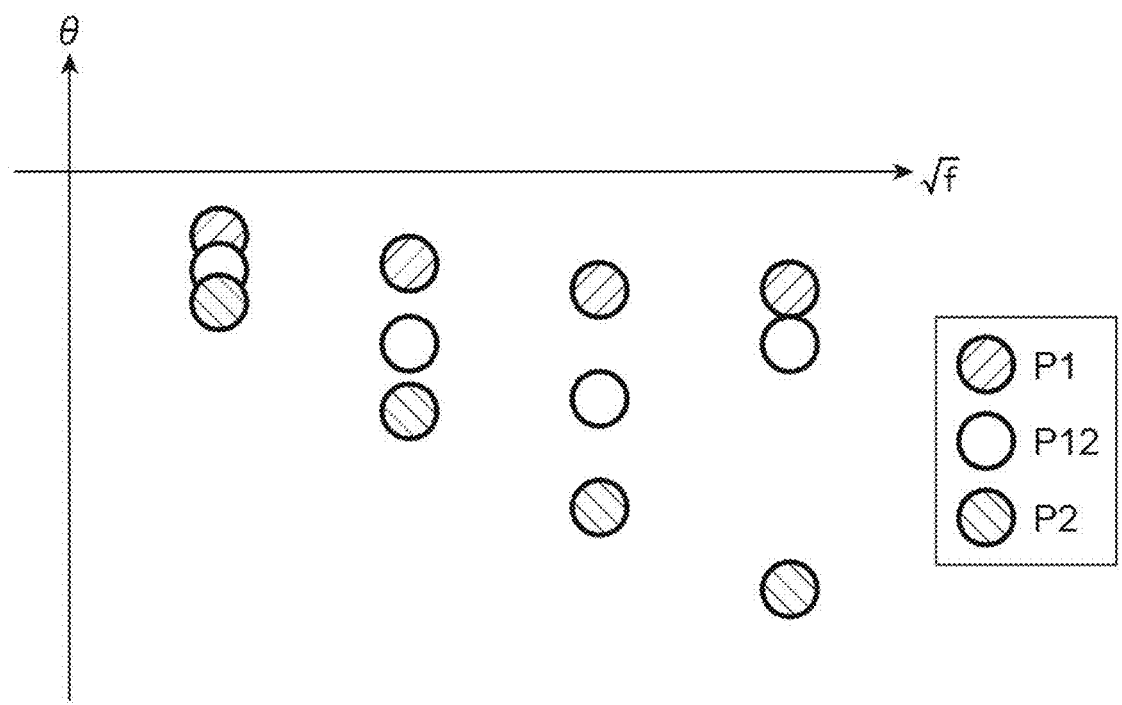
FIG. 5 is a graph plotting the relationship between the square root $f^{1/2}$ of a frequency and a phase component θ analyzed by the inspection device 19.

The inspection device 19 acquires a phase component θ of the characteristic signal obtained at each scanning position, and analyzes the relationship between the phase component θ and the square root $f^{1/2}$ of the frequency for each scanning position. FIG. 5 shows a graph plotting the relationship between the square root $f^{1/2}$ of the frequency and the phase component θ analyzed by the inspection device 19. Thus, an analysis point P1 of the phase component θ corresponding to the scanning position in the area A1, an analysis point P2 of the phase component θ corresponding to the scanning position in the area A2, and an analysis point P12 of the phase component θ corresponding to the scanning position in the area A12 are obtained so as to have different characteristics.

Figure 6:
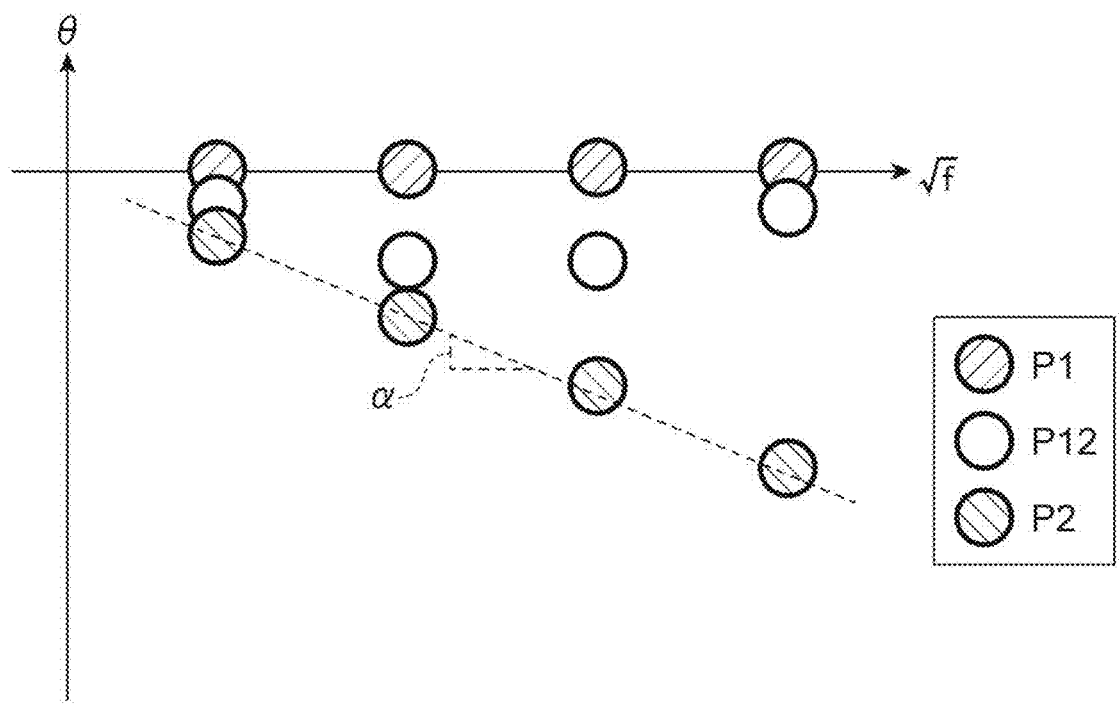
FIG. 6 is a graph plotting the relationship between the square root $f^{1/2}$ of a frequency and the phase component θ corrected by the inspection device 19.

In addition, the inspection device 19 corrects each analysis point of the phase component θ at an arbitrary scanning position obtained as described above, with the analysis point P1 at a known scanning position as a reference, so that the phase component θ at the analysis point P1 is canceled out. At this time, when the value changes discontinuously from $-\pi$ to $\pi$ (or vice versa) due to the cancellation of the phase component θ, the inspection device 19 adds $-2\pi$ (or $2\pi$) to the phase component θ to maintain the continuity of the phase so that the subsequent analysis is not adversely affected. FIG. 6 shows a graph plotting the relationship between the square root $f^{1/2}$ of the frequency and the phase component θ corrected by the inspection device 19. The characteristics of the phase component θ corrected as described above with respect to the square root $f^{1/2}$ of the frequency are different among the areas A1, A2, and A12. That is, the characteristic corresponding to the area A1 is that a value close to zero is always obtained, the characteristic corresponding to the area A2 is a linear characteristic with an inclination α with respect to the square root $f^{1/2}$ of the frequency, and the characteristic corresponding to the area A12 is a characteristic having an extreme value.

Then, the inspection device 19 specifies, from the characteristics of the phase component θ at the arbitrary scanning position corrected as described above, a characteristic that the change between the square roots $f^{1/2}$ of different frequencies is linear, as a characteristic of the scanning position corresponding to the area A2. At this time, when the analysis point has only the first frequency f1 and the second frequency f2, the inspection device 19 may specify the characteristics of the scanning position where the change between the square roots $f^{1/2}$ of the two frequencies f1 and f2 is relatively large as the frequency characteristics of the scanning position corresponding to the area A2. In addition, based on the analysis point P2 at the scanning position corresponding to the specified area A2, the inspection device 19 normalizes the rate of change of the phase component θ with respect to the square root $f^{1/2}$ of the frequency, for the characteristics of the phase component θ at the arbitrary scanning position, with the inclination (rate of change) a between the square roots $f^{1/2}$ of the different frequencies at the analysis point P2 as a reference. Specifically, in the characteristics of the arbitrary scanning position, the characteristics are normalized so that the horizontal axis is scaled by $\Omega = |\alpha| \times f^{1/2}$. At this time, the inclination a may be calculated from the inclination of a straight line obtained by approximating a plurality of analysis point P2.

Alternatively, when the analysis point P2 has only two points corresponding to the first frequency f1 and the second frequency f2, the inclination α may be calculated from the inclination between the two points.

Figure 7:
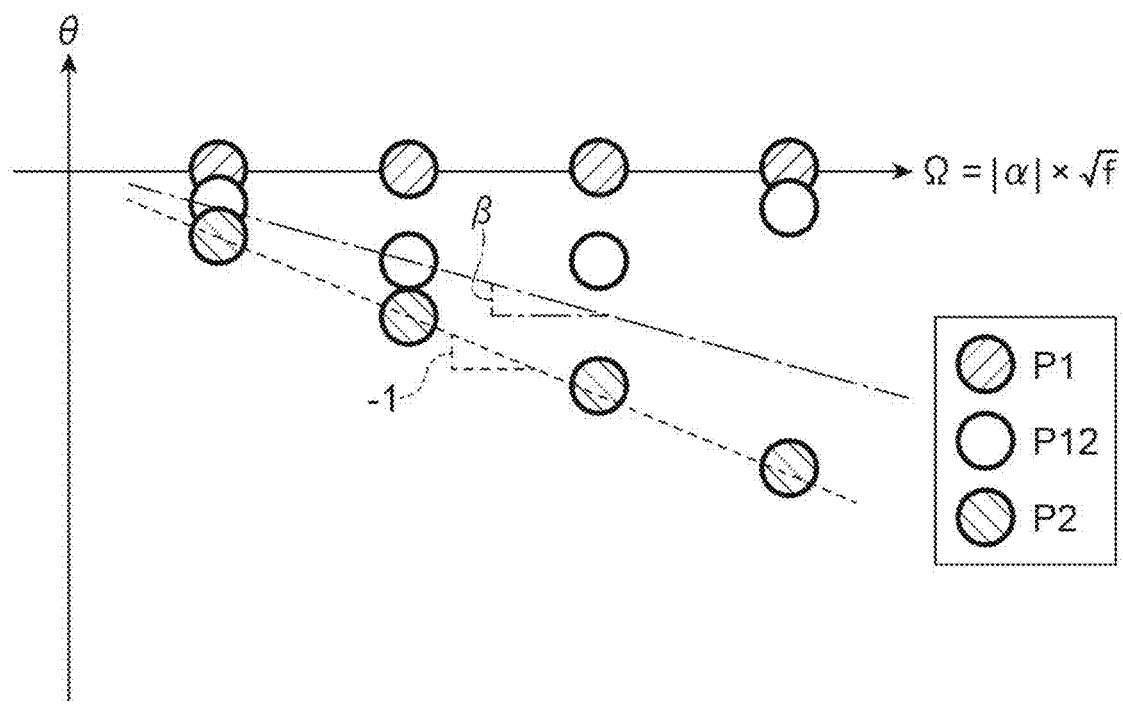
FIG. 7 is a graph plotting the relationship between the phase component θ normalized by the inspection device 19 and a frequency scaling value Ω.

FIG. 7 shows a graph plotting the relationship between the phase component θ normalized by the inspection device 19 and the frequency scaling value Ω. At this time, from the theoretical equation of the above Equation (1), the inclination of the phase component θ at a point where the frequency is low (point near zero) is expressed by the following Equation (2).

[Equation 1]

$$\left.\frac{d\theta}{d\Omega}\right|_{\Omega \sim 0} = -\frac{\gamma_2}{\gamma_1 + \gamma_2} \quad (2)$$

When the modulation frequency is low, the electrical characteristics of the first layer L1 and the second layer L2 are reflected in the characteristic signal SG. However, when the modulation frequency is high, the electrical characteristics of the second layer L2 are not reflected in the characteristic signal.

Using this property, the inspection device 19 acquires the value of each pixel of the two-dimensional image, which is expressed by the characteristic signal obtained at a sufficiently high modulation frequency, as the temperature coefficient $\gamma_1$ of the first layer L1. However, since the contribution of the second layer L2 never becomes zero and is not small, the numerical value after applying a filter that determines the weight based on the variation of phase and the sigmoid function is taken as the temperature coefficient $\gamma_1$. According to this filter, the weight is determined as follows. That is, assuming that the amplitude and phase of a pixel of interest are R0 and θ0, respectively, and the amplitude and phase of a surrounding pixel are Ri and θi (i=1, 2, ..., N−1, N is a natural number), a value s is calculated by the following Equation (3).

[Equation 2]

$$s = \frac{\sum_{i=0}^{N-1} \cos(\theta_i - \theta_0)}{N} \quad (3)$$

Based on this value s, a weight w is determined by the following Equation (4).

[Equation 3]

$$w = \frac{1}{1 - \exp\left(\frac{s - s_{th}}{r}\right)} \quad (4)$$

In addition, the inspection device 19 calculates an inclination (rate of change) β of the analysis point with respect to the scaling value Ω near Ω=0 while referring to the analysis point of the phase component θ at the arbitrary scanning position normalized by the function described above. The inclination 13 may be calculated from the inclination between the analysis point corresponding to the first frequency f1 and the analysis point corresponding to the second frequency f1, or a curve approximating three or more analysis points may be calculated and the inclination β may be calculated from the inclination of the tangent of the curve at Ω=0. Then, the inspection device 19 calculates the temperature coefficient $\gamma_2$ at the scanning position by substituting the determined temperature coefficient $\gamma_1$ at the pixel corresponding to the scanning position and the inclination β calculated corresponding to the scanning position into the above Equation (2).

The inspection device 19 calculates the temperature coefficients $\gamma_1$ and $\gamma_2$ for each scanning position by repeating such calculation of the temperature coefficient $\gamma_2$ for each scanning position. In addition, the inspection device 19 outputs the inclination β calculated for each scanning position to the input/output module 106, such as a display, as a two-dimensional image, and outputs the temperature coefficients $\gamma_1$ and $\gamma_2$ calculated for each scanning position to the input/output module 106 as a two-dimensional image showing the electrical characteristics of the first layer L1 and the second layer L2.

Figure 8:
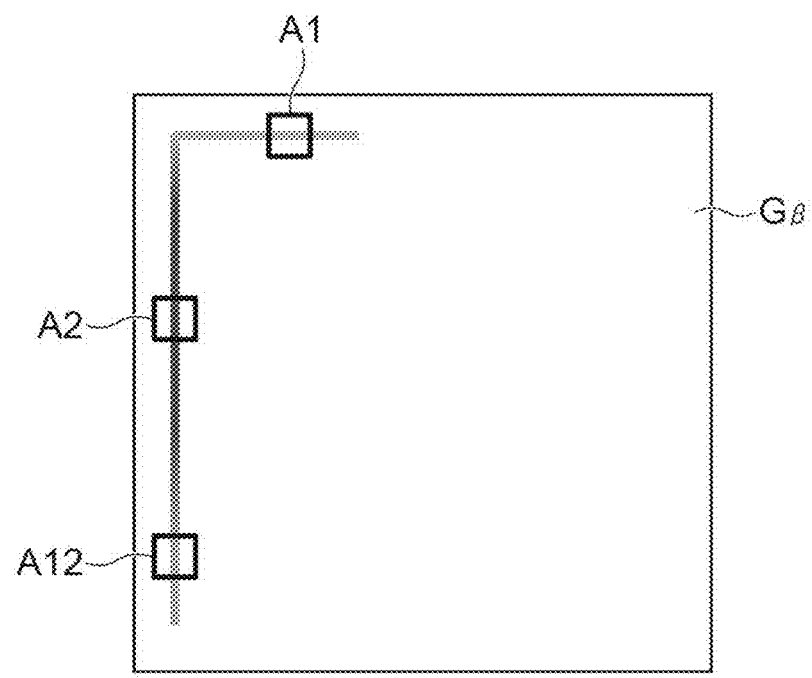
FIG. 8 is a diagram showing an example of a two-dimensional image $G_β$ with an inclination 13 output from the inspection device 19.
Figure 9:
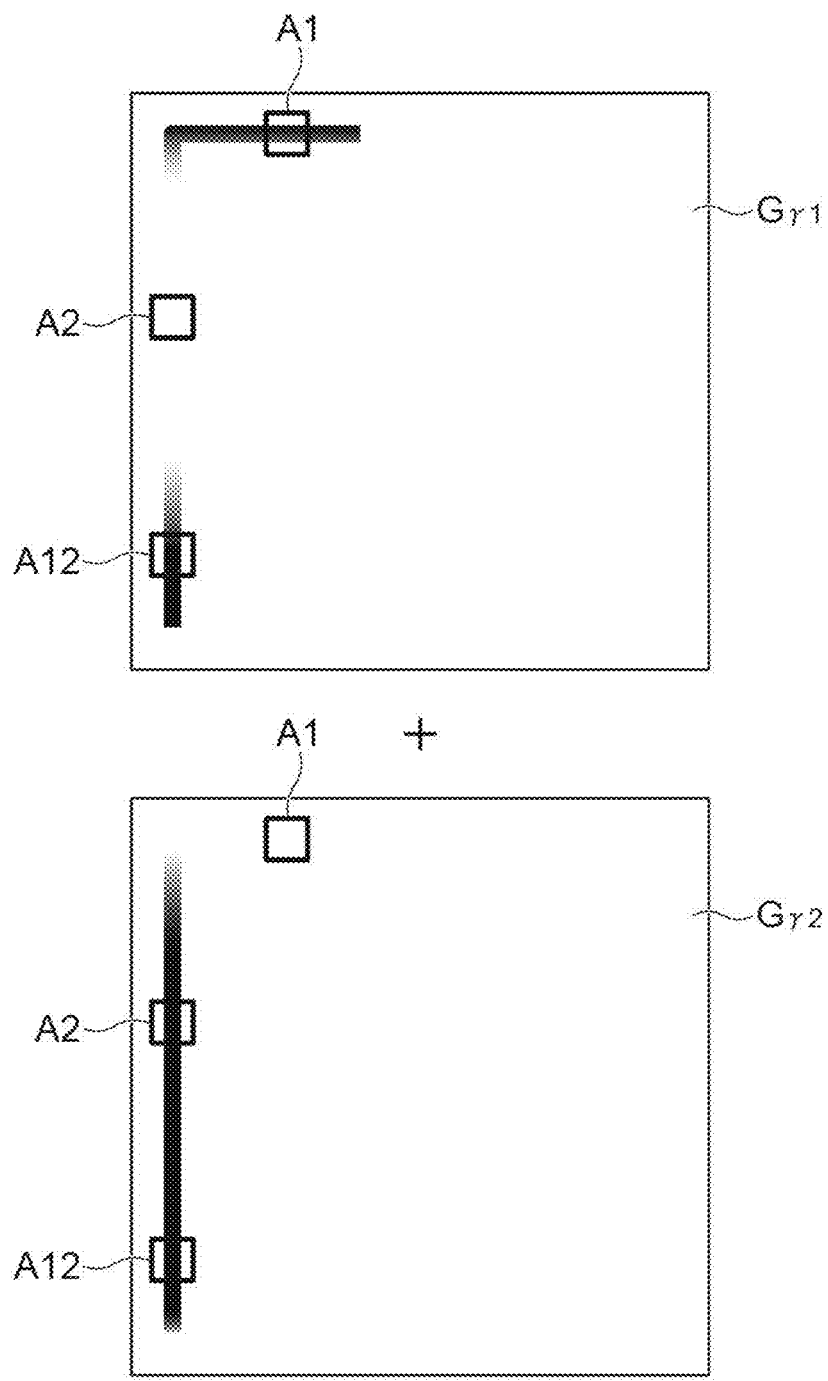
FIG. 9 is a diagram showing examples of two-dimensional images $G_{γ1}$ and $G_{γ2}$ with temperature coefficients $γ_1$ and $γ_2$ output from the inspection device 19.

FIG. 8 shows an example of a two-dimensional image $G_\beta$ with the inclination β output from the inspection device 19, and FIG. 9 shows examples of two-dimensional images $G_{\gamma 1}$ and $G_{\gamma 2}$ with the temperature coefficients $\gamma_1$ and $\gamma_2$ output from the inspection device 19. Thus, the distribution of the inclination β at each scanning position is reflected on the two-dimensional image $G_\beta$, and the distributions of the temperature coefficients $\gamma_1$ and $\gamma_2$ at each scanning position are reflected on the two-dimensional images $G_{\gamma 1}$ and $G_{\gamma 2}$, respectively.

Here, when reflecting the temperature coefficients $\gamma_1$ and $\gamma_2$ on the two-dimensional images $G_{\gamma 1}$ and $G_{\gamma 2}$, in order to make it easier to analyze the characteristics of each layer on the image, values $\gamma_{1w}$, and $\gamma_2 w$ weighted by using the amplitude R of the characteristic signal lock-in detected at the modulation frequency to which both the first layer L1 and the second layer L2 react may be calculated by the following Equations (5) and (6) by the inspection device 19.

[Equation 4]

$$\gamma_{1w} = \frac{\gamma_1}{|\gamma_1| + |\gamma_2|} \times \left(1 - \exp\left(-\frac{R}{R_{th}}\right)\right) \quad (5)$$

-continued

[Equation 5]

$$\gamma_{2w} = \frac{\gamma_2}{|\gamma_1|+|\gamma_2|} \times \left(1 - \exp\left(-\frac{R}{R_{th}}\right)\right) \quad (6)$$

In addition, $R_{th}$ is a threshold value for adjustment to make an image easier to see.

Figure 10:
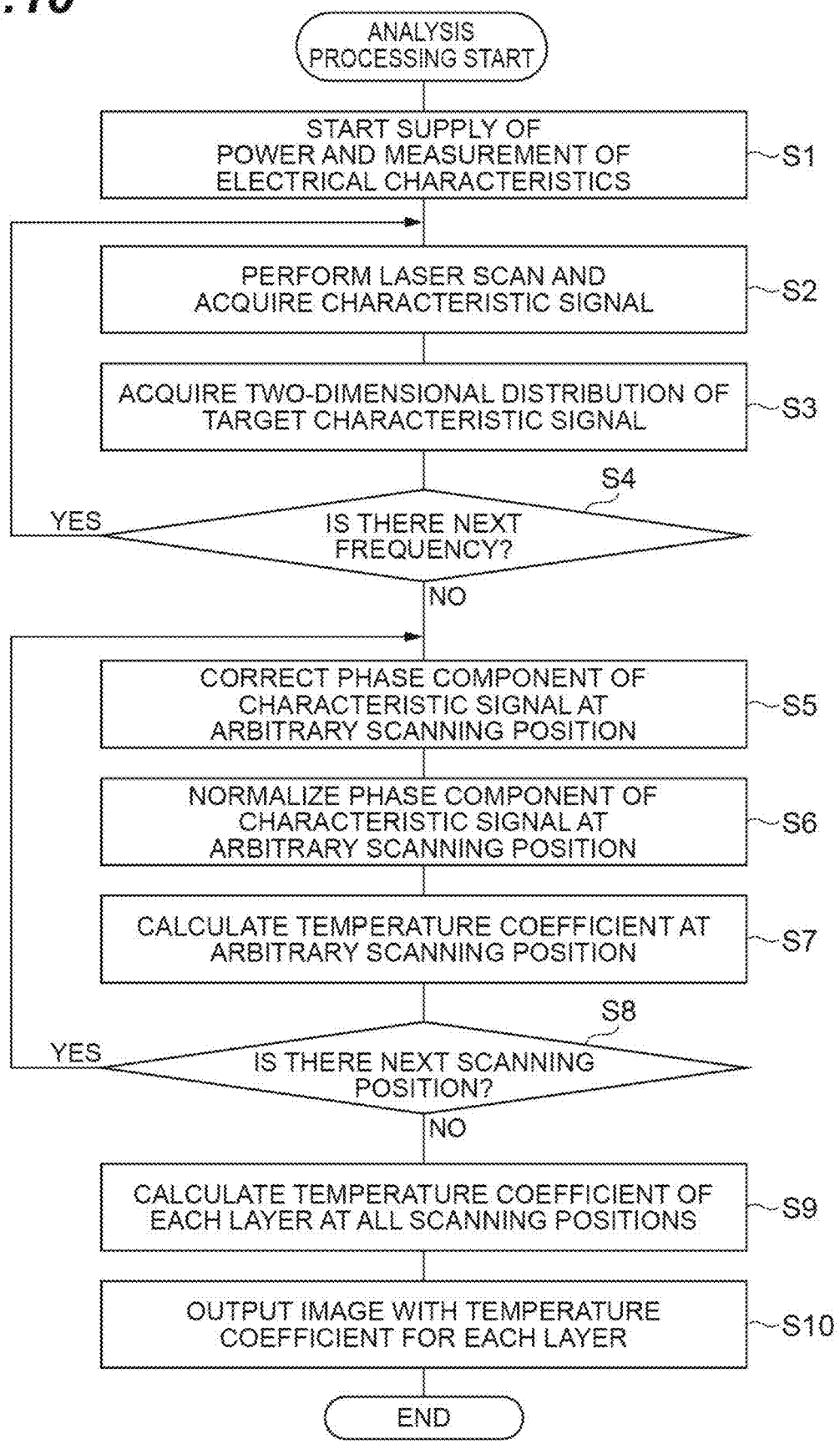
FIG. 10 is a flowchart showing a procedure of analysis processing by the semiconductor inspection device 1.

Next, the procedure of analysis processing for the semiconductor device S using the semiconductor inspection device 1 according to the present embodiment, that is, the flow of a semiconductor device inspection method according to the present embodiment will be described. FIG. 10 is a flowchart showing the procedure of analysis processing by the semiconductor inspection device 1.

First, the measuring device 7 starts the supply of power to the semiconductor device S and the measurement of the electrical characteristics of the semiconductor device S (step S1). Then, the inspection device 19 controls the operation of the optical scanning device 13, so that the semiconductor device S is two-dimensionally scanned with laser light intensity-modulated with the first frequency f1 and at the same time, the inspection device 19 acquires a characteristic signal lock-in-detected at the first frequency f1 by the lock-in amplifier 15 (step S2).

In addition, the inspection device 19 acquires a two-dimensional image showing the two-dimensional distribution of the acquired characteristic signals (step S3). Thereafter, the modulation frequency of the laser light is sequentially changed to the second frequency f1 and a frequency other than the first and second frequencies (step S4), and the processes of steps S2 and S3 are repeated to obtain a plurality of characteristic signals lock-in detected at a plurality of frequencies f2, . . . .

Then, the inspection device 19 analyzes the relationship between the phase component θ of the characteristic signal and the square root $f^{1/2}$ of the frequency based on the characteristic signal at each scanning position, and corrects the analysis point of the phase component θ at an arbitrary scanning position with the analysis point of the phase component in the area A1 of the semiconductor device S as a reference (step S5). In addition, the inspection device 19 specifies the analysis point P2 of the phase component θ corresponding to the scanning position in the area A2 of the semiconductor device S from the analysis point of the phase component θ at the arbitrary scanning position, and normalizes the rate of change of the analysis point of the phase component θ at the arbitrary scanning position with the inclination α between the analysis points P2 as a reference (step S6).

Thereafter, the inspection device 19 calculates the inclination β near Ω=0 at the analysis point of the normalized phase component θ at the arbitrary scanning position, and calculates the temperature coefficient $\gamma_2$ of the second layer L2 at the scanning position based on the inclination β and the temperature coefficient $\gamma_1$ of the first layer L1 at the scanning position separately acquired (step S7). Thereafter, the scanning position to be analyzed is sequentially changed (step S7), and the processes of steps S5 to S7 are repeated to acquire the temperature coefficients $\gamma_1$ and $\gamma_2$ at a plurality of scanning positions.

In addition, the inspection device 19 adjusts the temperature coefficients $\gamma_1$ and $\gamma_2$ at all scanning positions to values $\gamma_1 w$ and $\gamma_2 w$ by weighting (step S10). Finally, the inspection device 19 outputs two-dimensional images showing the distributions of the temperature coefficients $\gamma_1 w$ and $\gamma_2 w$ in the respective layers L1 and L2 (step S10).

According to the semiconductor inspection device 1 described above, a characteristic signal is acquired by lock-in detecting the electrical characteristics of the semiconductor device S of a plurality of frequency components while two-dimensionally scanning the semiconductor device S with laser light modulated with a plurality of frequencies. Then, the phase component θ of the acquired characteristic signal at the arbitrary scanning position is corrected with the phase component θ of the characteristic signal at the scanning position reflecting the electrical characteristics of the first layer L1 of the semiconductor device S as a reference. In addition, the phase component θ of the characteristic signal at the scanning position reflecting the electrical characteristics of the second layer L2 of the semiconductor device S is specified, and the phase component θ of the characteristic signal at the arbitrary scanning position is normalized by using the phase component θ. In addition, a result based on the normalized phase component θ of the characteristic signal at the arbitrary scanning position is output. Therefore, it is possible to estimate the layer structure of the semiconductor device S at the arbitrary scanning position, and it is possible to analyze the electrical characteristics corresponding to the stacked structure of the semiconductor device S.

In addition, by correcting the phase component θ as described above, it is possible to acquire the relative value of the phase component θ at the arbitrary scanning position with respect to the phase component θ of the characteristic signal at the scanning position reflecting the electrical characteristics of the first layer L1. As a result, it is possible to easily estimate the layer structure based on the phase component θ.

In addition, when normalizing the phase component θ as described above, the scanning position is specified based on the frequency characteristics of the phase component θ of the characteristic signal, so that it is possible to easily acquire the phase component θ of the characteristic signal reflecting the electrical characteristics of the second layer L2. As a result, it is possible to easily estimate the layer structure at the arbitrary scanning position. Specifically, a scanning position is specified at which a change in the corrected phase component θ of the characteristic signal between different frequencies is relatively large. In this case, it is possible to easily acquire the phase component θ of the characteristic signal reflecting the electrical characteristics of the second layer L2. In addition, a scanning position is specified at which a change in the corrected phase component θ of the characteristic signal between the frequencies is linear. Also in this case, it is possible to easily acquire the phase component θ of the characteristic signal reflecting the electrical characteristics of the second layer L2.

In addition, in the present embodiment, by normalizing the phase component θ of the characteristic signal, the frequency characteristics of the normalized phase signal θ of the characteristic signal at the arbitrary position become a waveform that reveals the layer structure of the semiconductor device S. As a result, the accuracy of estimating the layer structure at the arbitrary scanning position is improved.

In the present embodiment, when normalizing the phase component θ of the characteristic signal, the rate of change of the phase component θ at the scanning position reflecting the electrical characteristics of the second layer L2 with respect to the square root $f^{1/2}$ of the frequency is used to normalize the rate of change of the phase component θ at the arbitrary scanning position with respect to the square root $f^{1/2}$ of the frequency. With such a configuration, the frequency characteristics of the normalized phase signal θ of the characteristic signal at the arbitrary position become a waveform that more reveals the layer structure of the semiconductor device S, so that the accuracy of estimating the layer structure at the arbitrary scanning position is more improved.

In addition, in the present embodiment, an image showing the inclination β of the phase component θ of the characteristic signal at the arbitrary scanning position with respect to the frequency is output. Therefore, it is possible to visualize the layer structure of the semiconductor device S at the arbitrary scanning position, and it is possible to analyze the electrical characteristics corresponding to the stacked structure of the semiconductor device S by referring to the visualized image.

In addition, in the present embodiment, an image showing the temperature coefficient $γ_1$ of the first layer L1 at the arbitrary scanning position and an image showing the temperature coefficient γz of the second layer L2 at the arbitrary scanning position are output in parallel. With such a function, it is possible to visualize the electrical characteristics of each of the layers L1 and L2 at the arbitrary scanning position of the semiconductor device S, and the electrical characteristics of each of the layers L1 and L2 of the semiconductor device S can be analyzed based on the visualized image.

While the various embodiments of the present invention have been described above, the present invention is not limited to the above-described embodiments, and can be modified or applied to others without departing from the scope described in the claims.

Figure 11:
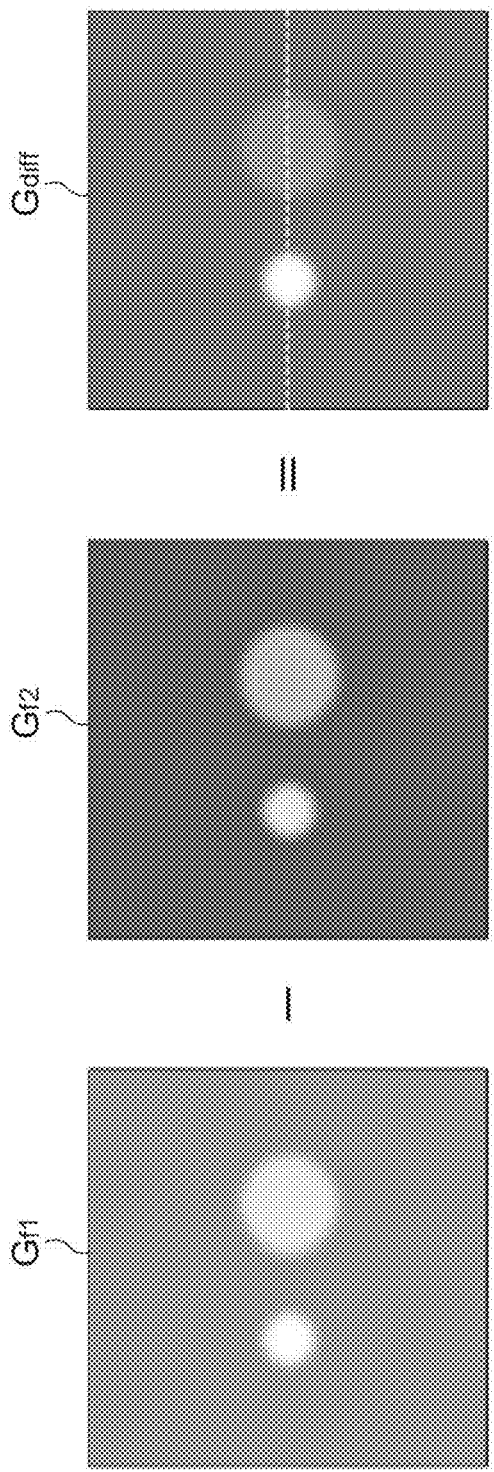
FIG. 11 is a diagram showing an image of a difference image generated according to a modification example of the present disclosure.

For example, the inspection device 19 may generate or output an image showing the two-dimensional distribution of the difference between the phase component θ of the characteristic signal lock-in detected at the first frequency f1 and the phase component θ of the characteristic signal lock-in detected at the second frequency f2 higher than the first frequency f1. For example, as shown in FIG. 11, a difference image $G_{diff}$ reflecting the difference in phase component θ between images $G_{f1}$ and $G_{f2}$ may be generated based on the image $G_{f1}$ showing the phase component θ at the first frequency f1 and an image $G_{f2}$ showing the phase component θ at the second frequency f2. Based on such a difference image $G_{diff}$, it is possible to visually acquire the information of the layer depth at each scanning position of the semiconductor device S. When outputting the difference image $G_{diff}$, the inspection device 19 may express the difference in phase component θ by gradation or convert the difference into a hue with reference to a LUT (Look-up Table) or the like.

Figure 12:
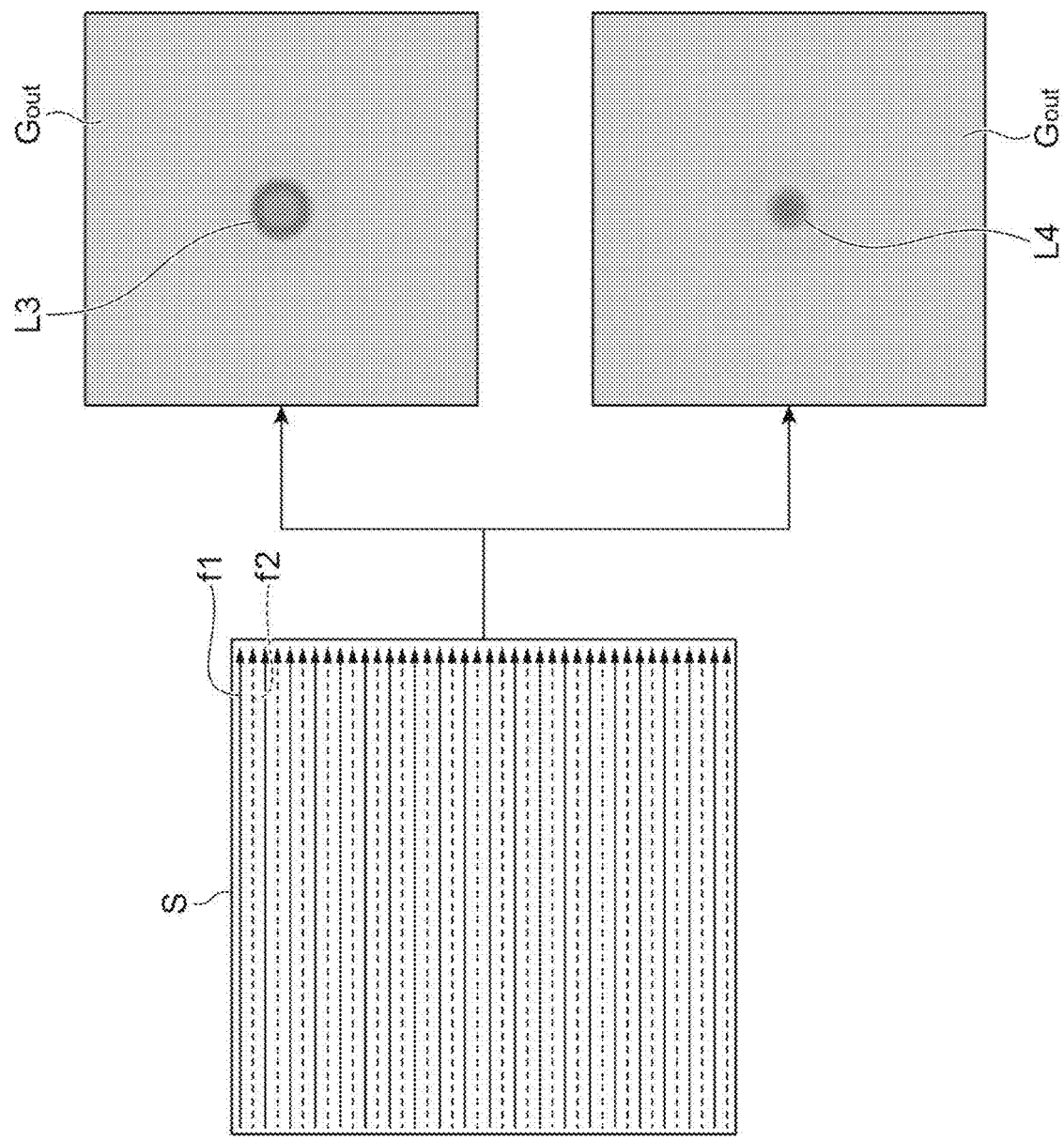
FIG. 12 is an image of an output image generated according to a modification example of the present disclosure.

In addition, the semiconductor inspection device 1 may operate to perform a two-dimensional laser light scan by repeating a one-dimensional scan along a plurality of lines on the semiconductor device S while shifting in a direction perpendicular to the lines and to change the modulation frequency for each one-dimensional scan alternately between the first frequency f1 and the second frequency. For example, the first frequency f1 is set to 1 Hz, and the second frequency is set to 4 Hz. FIG. 12 shows an example of an image $G_{out}$ showing the two-dimensional distribution of the phase component θ generated by lock-in detection corresponding to the modulation frequencies f1 and f2 for each line by the semiconductor inspection device 1 according to such a modification example. According to such a modification example, it is also possible to easily distinguish between the electrical characteristics of a layer L3 located far from the light source 9 and the electrical characteristics of a layer L4 located close to the light source 9.

In addition, in the inspection device 19, the characteristics of the phase component θ at the scanning position corresponding to the area A2 are specified based on the change between the square roots $f^{1/2}$ of different frequencies. However, the scanning position included in the area A2 of the semiconductor device S may be set in the inspection device 19 in advance by the user. Alternatively, the scanning position may be automatically specified in advance by the inspection device 19 based on the design data.

In the embodiment described above, the semiconductor device S having a two-layer structure including the first layer L1 and the second layer L2 is a target. However, the inspection device 19 has an analysis function for the semiconductor device S having a three-layer structure or more.

Figure 13:
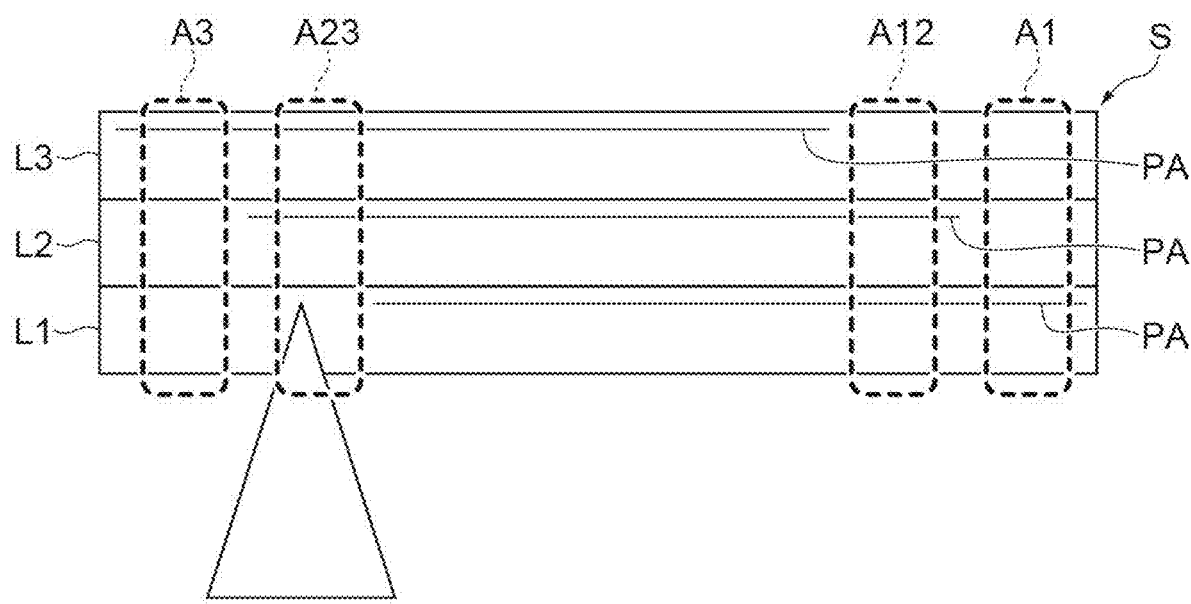
FIG. 13 is a diagram showing an example of a stacked structure of a semiconductor device S to be measured according to a modification example of the present disclosure.

For example, as shown in FIG. 13, a semiconductor device S having a multilayer structure including a first layer L1 at the first position, a second layer L2 at the second position, and a third layer L3 at the third position from the side close to the light source 9 may be a target. In such a semiconductor device S, from the design data or the like, it is assumed that an area A1 having a path PA through which a current flows only in the first layer L1, an area A12 having a path PA in the first layer L1 and the second layer, an area A23 having a path PA in the second layer L2 and the third layer L3, and an area A3 having a path PA only on the third layer L3 are known. In addition, it is assumed that the laser light from the light source 9 is emitted so as to be focused on the first layer L1.

When the semiconductor device S configured as described above is a target, the inspection device 19 first performs phase correction and normalization of the rate of change of the characteristic signal at all scanning positions with the characteristic signal of the area A1 as a reference, and normalizes the rate of change of the characteristic signal at all scanning positions with the characteristic signal of the area A23 as a reference. Then, by performing the analysis processing of the above-described embodiment on the characteristic signal of the area A1 and the characteristic signal of the area A23, the temperature coefficient $γ_1$ of the first layer L1 and the temperature coefficient $γ_{23}$ of the second layer L2 and the third layer L3 at all scanning positions are acquired.

Then, the inspection device 19 performs the analysis processing of the above-described embodiment on the characteristic signal of the area A3 and the characteristic signal of the area A12 to acquire the temperature coefficient $γ_3$ of the third layer L3 and the temperature coefficient $γ_{12}$ of the first layer L1 and the second layer L2 at all scanning positions.

According to such a modification example, it is possible to estimate the electrical characteristics of each of the layers L1, L2, and L3 at the arbitrary scanning position for a semiconductor device having a three-layer structure.

Figure 14:
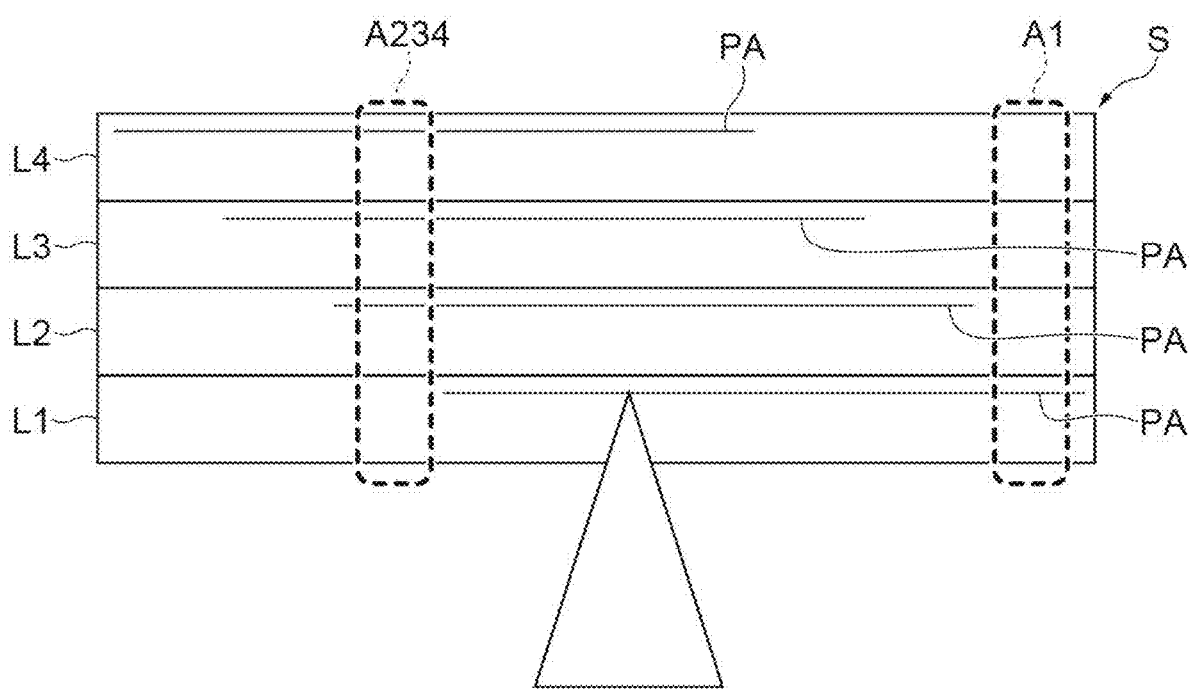
FIG. 14 is a diagram showing an example of a stacked structure of a semiconductor device S to be measured according to a modification example of the present disclosure.

In addition, the inspection device 19 may have an analysis function for a semiconductor device S having a four-layer structure shown in FIG. 14. The semiconductor device S shown in FIG. 14 has a multilayer structure including a first layer L1 at the first position, a second layer L2 at the second position, a third layer L3 at the third position, and a fourth layer L4 at the fourth position from the side close to the light source 9. In such a semiconductor device S, from the design data or the like, it is assumed that an area A1 having a path PA through which a current flows only in the first layer L1 and area A234 having a path PA in the second layer L2, the third layer L3, and the fourth layer L4 are known. In addition, it is assumed that the laser light from the light source 9 is emitted so as to be focused on the first layer L1.

When the semiconductor device S configured as described above is a target, the inspection device 19 first performs phase correction of the characteristic signal at all scanning positions with the characteristic signal of the area A1 as a reference, and normalizes the rate of change of the characteristic signal at all scanning positions with the characteristic signal of the area A234 as a reference. Then, by performing the analysis processing of the above-described embodiment on the characteristic signal of the area A1 and the characteristic signal of the area A234, the temperature coefficient $\gamma_1$ of the first layer L1 and the temperature coefficient $\gamma_{234}$ of the second layer L2, the third layer L3, and the fourth layer L4 at all scanning positions are acquired. Thereafter, the inspection device 19 performs the above-described analysis processing on the characteristic signal at each scanning position for the semiconductor device S having a three-layer structure, so that it is possible to acquire the temperature coefficients $\gamma_2$, $\gamma_3$, and $\gamma_4$ of the second to fourth layers L2 to L4.

According to such a modification example, it is possible to estimate the electrical characteristics of each of the layers L1, L2, L3, and L4 at the arbitrary scanning position for a semiconductor device having a fourth-layer structure. Similarly, it is possible to estimate the electrical characteristics of each layer at an arbitrary scanning position for a semiconductor device having a structure of five or more layers.

In the embodiment described above, in the step of correcting, it is preferable to correct the phase component of the characteristic signal at the arbitrary scanning position so as to cancel out the phase component of the characteristic signal at the first scanning position. In the embodiment described above, it is preferable that the processor corrects the phase component of the characteristic signal at the arbitrary scanning position so as to cancel out the phase component of the characteristic signal at the first scanning position. Therefore, since the relative value of the phase component at the arbitrary scanning position with respect to the phase component of the characteristic signal at the first scanning position reflecting the electrical characteristics of the first position can be acquired, it is possible to easily estimate the layer structure based on the phase component.

In addition, in the step of normalizing, it is preferable to specify the phase component of the characteristic signal at the second scanning position based on a change in the corrected phase component of the characteristic signal between the first frequency and the second frequency. In addition, it is preferable that the processor specifies the phase component of the characteristic signal at the second scanning position based on a change in the corrected phase component of the characteristic signal between the first frequency and the second frequency. In this case, by specifying the second scanning position based on the frequency characteristics of the phase component of the characteristic signal, it is possible to easily acquire the phase component of the characteristic signal reflecting the electrical characteristics of the second position. As a result, it is possible to easily estimate the layer structure at the arbitrary scanning position.

In addition, it is preferable that the first position is closer to an emission source of the light than the second position and in the step of normalizing, a scanning position where the change in the corrected phase component of the characteristic signal between the first frequency and the second frequency is relatively large is set as the second scanning position. In addition, it is preferable that the first position is closer to an emission source of the light than the second position and the processor sets, as the second scanning position, a scanning position where the change in the corrected phase component of the characteristic signal between the first frequency and the second frequency is relatively large. In this case, by specifying the second scanning position based on the magnitude of the change in the phase component of the characteristic signal between the two frequencies, it is possible to easily acquire the phase component of the characteristic signal reflecting the electrical characteristics of the second position. As a result, it is possible to easily estimate the layer structure at the arbitrary scanning position.

In addition, in the step of normalizing, it is preferable that a change in the phase component of the characteristic signal at the arbitrary scanning position between the first frequency and the second frequency is normalized with a change in the phase component of the characteristic signal at the second scanning position between the first frequency and the second frequency as a reference. In addition, it is preferable that the processor normalizes a change in the phase component of the characteristic signal at the arbitrary scanning position between the first frequency and the second frequency with a change in the phase component of the characteristic signal at the second scanning position between the first frequency and the second frequency as a reference. According to such a configuration, the frequency characteristics of the normalized phase signal of the characteristic signal at the arbitrary position become a waveform that reveals the layer structure of the semiconductor device, so that the accuracy of estimating the layer structure at the arbitrary scanning position is improved.

In addition, it is preferable that, in the step of acquiring, the semiconductor device is further scanned with light intensity-modulated with a frequency other than the first and second frequencies and a characteristic signal is acquired and in the step of normalizing, a scanning position where a change of the corrected phase component of the characteristic signal with respect to a square root of a frequency is linear is set as the second scanning position. In addition, it is preferable that the processor further scans the semiconductor device with light intensity-modulated with a frequency other than the first and second frequencies and acquires characteristic signal and a scanning position where a change of the corrected phase component of the characteristic signal with respect to a square root of a frequency is linear is set as the second scanning position. According to such a configuration, since the second scanning position is specified based on the characteristics of the change in the phase component of the characteristic signal with respect to the square root of the frequency, it is possible to reliably acquire the phase component of the characteristic signal reflecting the electrical characteristics of the second position. As a result, it is possible to reliably estimate the layer structure at the arbitrary scanning position.

In addition, in the step of normalizing, it is preferable that a rate of change of the phase component of the characteristic signal at the arbitrary scanning position with respect to the square root of the frequency is normalized by using a rate of change of the phase component of the characteristic signal at the second scanning position with respect to the square root of the frequency. In addition, it is preferable that the processor normalizes a rate of change of the phase component of the characteristic signal at the arbitrary scanning position with respect to the square root of the frequency by using a rate of change of the phase component of the characteristic signal at the second scanning position with respect to the square root of the frequency. By adopting such a configuration, the frequency characteristics of the normalized phase signal of the characteristic signal at the arbitrary position become a waveform that more reveals the layer structure of the semiconductor device, so that the accuracy of estimating the layer structure at the arbitrary scanning position is more improved.

In addition, in the step of outputting, it is preferable to output an image showing a change of the phase component of the characteristic signal at the arbitrary scanning position with respect to a frequency. In addition, it is preferable that the processor outputs an image showing a change of the phase component of the characteristic signal at the arbitrary scanning position with respect to a frequency. By adopting such a configuration, it is possible to visualize the layer structure of the semiconductor device at the arbitrary scanning position, and it is possible to analyze the electrical characteristics corresponding to the stacked structure of the semiconductor device by referring to the visualized image.

In addition, in step of outputting, it is preferable to output at least an image showing the electrical characteristics of the first position at the arbitrary scanning position and an image showing the electrical characteristics of the second position at the arbitrary scanning position based on a change of the phase component of the characteristic signal at the arbitrary scanning position with respect to a frequency. In addition, it is preferable that the processor outputs at least an image showing the electrical characteristics of the first position at the arbitrary scanning position and an image showing the electrical characteristics of the second position at the arbitrary scanning position based on a change of the phase component of the characteristic signal at the arbitrary scanning position with respect to a frequency. In this case, it is possible to visualize the electrical characteristics of each layer at the arbitrary scanning position of the semiconductor device, and the electrical characteristics of each layer of the semiconductor device can be analyzed based on the visualized image.

INDUSTRIAL APPLICABILITY

The embodiment is intended for use as a semiconductor device inspection method and a semiconductor device inspection device, so that it is possible to analyze the electrical characteristics corresponding to the stacked structure of a semiconductor device.

REFERENCE SIGNS LIST

1: semiconductor inspection device, 3: voltage application device, 5: current measuring device, 7: measuring device, 9: light source, 11: signal source, 13: optical scanning device, 15: lock-in amplifier (signal acquisition device), 17: photodetector, 19: inspection device, 101: CPU (processor), 102: RAM, 103: ROM, 104: communication module, 106: input/output module, S: semiconductor device.

The invention claimed is:

1. A semiconductor device inspection method, comprising:
   supplying power to a semiconductor device and measuring electrical characteristics of the semiconductor device according to the supply of the power;
   scanning the semiconductor device with light intensity-modulated with a first frequency and light intensity-modulated with a second frequency higher than the first frequency and acquiring a characteristic signal, acquired by measuring an electrical signal output from the semiconductor device, indicating the electrical characteristics of the first frequency component and the second frequency component according to the scanning;
   correcting a phase component of the characteristic signal at a plurality of scanning positions with a phase component of the characteristic signal at a first scanning position reflecting the electrical characteristics of a first position in an optical axis direction of the light in the semiconductor device as a reference;
   specifying a phase component of the characteristic signal at a second scanning position reflecting the electrical characteristics of a second position different from the first position in the optical axis direction of the light in the semiconductor device and normalizing the phase component of the characteristic signal at the plurality of scanning positions by using the phase component of the characteristic signal at the second scanning position, wherein the plurality of scanning positions comprise the first scanning position and the second scanning position; and
   outputting a result based on the normalized phase component of the characteristic signal at the plurality of scanning positions,
   wherein, in the correcting, the phase component of the characteristic signal at the plurality of scanning positions is corrected so as to cancel out the phase component of the characteristic signal at the first scanning position.

2. The semiconductor device inspection method according to claim 1,
   wherein, in the normalizing, the phase component of the characteristic signal at the second scanning position is specified based on a change in the corrected phase component of the characteristic signal between the first frequency and the second frequency.

3. The semiconductor device inspection method according to claim 2,
   wherein the first position is closer to an emission source of the light than the second position, and
   in the normalizing, a scanning position of the plurality of scanning positions where the change in the corrected phase component of the characteristic signal between the first frequency and the second frequency is relatively larger than other scanning positions of the plurality of scanning positions is set as the second scanning position.

4. The semiconductor device inspection method according to claim 1,
   wherein, in the normalizing, a change in the phase component of the characteristic signal at the plurality of scanning positions between the first frequency and the second frequency is normalized with a change in the phase component of the characteristic signal at the second scanning position between the first frequency and the second frequency as a reference.

5. The semiconductor device inspection method according to claim 2,
   wherein, in the acquiring, the semiconductor device is further scanned with light intensity-modulated with a frequency other than the first and second frequencies and a characteristic signal is acquired, and
   in the normalizing, a scanning position where a change of the corrected phase component of the characteristic signal with respect to a square root of a frequency is linear is set as the second scanning position.

6. The semiconductor device inspection method according to claim 5,
wherein, in the normalizing, a rate of change of the phase component of the characteristic signal at the plurality of scanning positions with respect to the square root of the frequency is normalized by using a rate of change of the phase component of the characteristic signal at the second scanning position with respect to the square root of the frequency.

7. The semiconductor device inspection method according to claim 1,
wherein, in the outputting, an image showing a change of the phase component of the characteristic signal at the plurality of scanning positions with respect to a frequency is output.

8. The semiconductor device inspection method according to claim 1,
wherein, in the Previously Presented outputting, at least an image showing the electrical characteristics of the first position at the plurality of scanning positions and an image showing the electrical characteristics of the second position at the plurality of scanning positions are output based on a change of the phase component of the characteristic signal at the plurality of scanning positions with respect to a frequency.

9. A semiconductor device inspection device, comprising:
a measuring device configured to supply power to a semiconductor device and measure electrical characteristics of the semiconductor device according to the supply of the power;
an optical scanner configured to scan the semiconductor device with light intensity -modulated with a first frequency and light intensity-modulated with a second frequency higher than the first frequency;
a signal acquisition device configured to acquire a characteristic signal, acquired by measuring an electrical signal output from the semiconductor device, indicating the electrical characteristics of the first frequency component and the second frequency component according to the scanning of the light; and
a processor configured to process the characteristic signal,
wherein the processor corrects a phase component of the characteristic signal at a plurality of scanning positions with a phase component of the characteristic signal at a first scanning position reflecting the electrical characteristics of a first position in an optical axis direction of the light in the semiconductor device as a reference, specifies a phase component of the characteristic signal at a second scanning position reflecting the electrical characteristics of a second position different from the first position in the optical axis direction of the light in the semiconductor device, normalizes the phase component of the characteristic signal at the plurality of scanning positions by using the phase component of the characteristic signal at the second scanning position, wherein the plurality of scanning positions comprise the first scanning position and the second scanning position, and outputs a result based on the normalized phase component of the characteristic signal at the plurality of scanning positions,
wherein the processor corrects the phase component of the characteristic signal at the plurality of scanning positions so as to cancel out the phase component of the characteristic signal at the first scanning position.

10. The semiconductor device inspection device according to claim 9,
wherein the processor specifies the phase component of the characteristic signal at the second scanning position based on a change in the corrected phase component of the characteristic signal between the first frequency and the second frequency.

11. The semiconductor device inspection device according to claim 10,
wherein the first position is closer to an emission source of the light than the second position, and
the processor sets, as the second scanning position, a scanning position where the change in the corrected phase component of the characteristic signal between the first frequency and the second frequency is relatively large.

12. The semiconductor device inspection device according to claim 9,
wherein the processor normalizes a change in the phase component of the characteristic signal at the plurality of scanning positions between the first frequency and the second frequency with a change in the phase component of the characteristic signal at the second scanning position between the first frequency and the second frequency as a reference.

13. The semiconductor device inspection device according to claim 10,
wherein the processor further scans the semiconductor device with light intensity -modulated with a frequency other than the first and second frequencies and acquires a characteristic signal, and
a scanning position where a change of the corrected phase component of the characteristic signal with respect to a square root of a frequency is linear is set as the second scanning position.

14. The semiconductor device inspection device according to claim 13,
wherein the processor normalizes a rate of change of the phase component of the characteristic signal at the plurality of scanning positions with respect to the square root of the frequency by using a rate of change of the phase component of the characteristic signal at the second scanning position with respect to the square root of the frequency.

15. The semiconductor device inspection device according to claim 9,
wherein the processor outputs an image showing a change of the phase component of the characteristic signal at the plurality of scanning positions with respect to a frequency.

16. The semiconductor device inspection device according to claim 9,
wherein the processor outputs at least an image showing the electrical characteristics of the first position at the plurality of scanning positions and an image showing the electrical characteristics of the second position at the plurality of scanning positions based on a change of the phase component of the characteristic signal at the plurality of scanning positions with respect to a frequency.

17. A semiconductor device inspection method, comprising:
supplying power to a semiconductor device and measuring electrical characteristics of the semiconductor device according to the supply of the power;
scanning the semiconductor device with light intensity-modulated with a first frequency and light intensity-modulated with a second frequency higher than the first frequency and acquiring a characteristic signal, acquired by measuring an electrical signal output from the semiconductor device, indicating the electrical characteristics of the first frequency component and the second frequency component according to the scanning;

correcting a phase component of the characteristic signal at a plurality of scanning positions with a phase component of the characteristic signal at a first scanning position reflecting the electrical characteristics of a first position in an optical axis direction of the light in the semiconductor device as a reference;

specifying a phase component of the characteristic signal at a second scanning position reflecting the electrical characteristics of a second position different from the first position in the optical axis direction of the light in the semiconductor device and normalizing the phase component of the characteristic signal at the plurality of scanning positions by using the phase component of the characteristic signal at the second scanning position, wherein the plurality of scanning positions comprise the first scanning position and the second scanning position; and outputting a result based on the normalized phase component of the characteristic signal at the plurality of scanning positions, wherein, in the normalizing, the phase component of the characteristic signal at the second scanning position is specified based on a change in the corrected phase component of the characteristic signal between the first frequency and the second frequency, wherein, in the acquiring, the semiconductor device is further scanned with light intensity-modulated with a frequency other than the first and second frequencies and a characteristic signal is acquired, in the normalizing, a scanning position where a change of the corrected phase component of the characteristic signal with respect to a square root of a frequency is linear is set as the second scanning position, and wherein, in the normalizing, a rate of change of the phase component of the characteristic signal at the plurality of scanning positions with respect to the square root of the frequency is normalized by using a rate of change of the phase component of the characteristic signal at the second scanning position with respect to the square root of the frequency.

18. A semiconductor device inspection device, comprising:

a measuring device configured to supply power to a semiconductor device and measure electrical characteristics of the semiconductor device according to the supply of the power;

an optical scanner configured to scan the semiconductor device with light intensity-modulated with a first frequency and light intensity-modulated with a second frequency higher than the first frequency;

a signal acquisition device configured to acquire a characteristic signal, acquired by measuring an electrical signal output from the semiconductor device, indicating the electrical characteristics of the first frequency component and the second frequency component according to the scanning of the light; and a processor configured to process the characteristic signal, wherein the processor corrects a phase component of the characteristic signal at a plurality of scanning positions with a phase component of the characteristic signal at a first scanning position reflecting the electrical characteristics of a first position in an optical axis direction of the light in the semiconductor device as a reference, specifies a phase component of the characteristic signal at a second scanning position reflecting the electrical characteristics of a second position different from the first position in the optical axis direction of the light in the semiconductor device, normalizes the phase component of the characteristic signal at the plurality of scanning positions by using the phase component of the characteristic signal at the second scanning position, wherein the plurality of scanning positions comprise the first scanning position and the second scanning position, and outputs a result based on the normalized phase component of the characteristic signal at the plurality of scanning positions, wherein the processor specifies the phase component of the characteristic signal at the second scanning position based on a change in the corrected phase component of the characteristic signal between the first frequency and the second frequency, wherein the processor further scans the semiconductor device with light intensity-modulated with a frequency other than the first and second frequencies and acquires a characteristic signal, a scanning position where a change of the corrected phase component of the characteristic signal with respect to a square root of a frequency is linear is set as the second scanning position, and wherein the processor normalizes a rate of change of the phase component of the characteristic signal at the plurality of scanning positions with respect to the square root of the frequency by using a rate of change of the phase component of the characteristic signal at the second scanning position with respect to the square root of the frequency.

* * * * *